(12) United States Patent
Edwards et al.

(10) Patent No.: US 7,225,373 B1
(45) Date of Patent: May 29, 2007

(54) DATA TRANSFER VALIDATION SYSTEM

(75) Inventors: Eric E. Edwards, Albuquerque, NM (US); Schuyler E. Shimanek, Albuquerque, NM (US); Phillip A. Young, Albuquerque, NM (US); Steven T. Reilly, Albuquerque, NM (US); Wayne E. Wennekamp, Rio Rancho, NM (US)

(73) Assignee: Xilinx, Inc., San Jose, CA (US)

( * ) Notice: Subject to any disclaimer, the term of this patent is extended or adjusted under 35 U.S.C. 154(b) by 572 days.

(21) Appl. No.: 10/741,689

(22) Filed: Dec. 18, 2003

(51) Int. Cl.
*G01R 31/28* (2006.01)

(52) U.S. Cl. .................... 714/725; 714/732; 714/733; 714/734

(58) Field of Classification Search .................... None
See application file for complete search history.

(56) References Cited

U.S. PATENT DOCUMENTS

| | | | | |
|---|---|---|---|---|
| 5,841,867 A | * | 11/1998 | Jacobson et al. | 713/187 |
| 5,925,140 A | * | 7/1999 | Hudson | 714/52 |
| 6,237,124 B1 | * | 5/2001 | Plants | 714/763 |
| 6,415,394 B1 | * | 7/2002 | Fruehling et al. | 714/30 |
| 6,560,743 B2 | * | 5/2003 | Plants | 714/763 |
| 6,625,688 B1 | * | 9/2003 | Fruehling et al. | 711/109 |
| 6,748,456 B1 | * | 6/2004 | Stanton et al. | 710/1 |
| 6,772,387 B1 | * | 8/2004 | Plants | 714/763 |
| 6,968,478 B1 | * | 11/2005 | Edwards et al. | 714/32 |
| 7,007,203 B2 | * | 2/2006 | Gorday et al. | 714/37 |

OTHER PUBLICATIONS

U.S. Appl. No. 10/740,783, filed Dec. 18, 2003, Edwards et al.
Gadiel Seroussi; "Table of Low-Weight Binary Irreducible Polynomials"; HPL-98-135; Aug. 1998; Hewlett Packard, Computer Systems Laboratory; Copyright Hewlett-Packard Company 1998; pp. 1-15.

\* cited by examiner

*Primary Examiner*—Albert Decady
*Assistant Examiner*—John P. Trimmings
(74) *Attorney, Agent, or Firm*—W. Eric Webostad

(57) ABSTRACT

System and apparatus for data validation is described. An initialization controller includes an initialization state machine. The initialization state machine is configured to cause configuration data to be transferred from memory internal or external to the integrated circuit to other memory internal to the integrated circuit. The configuration data is stored in the integrated circuit, read back from storage in the integrated circuit, and compressed by the integrated circuit after being read back. The configuration data is compressed into a signature, which may be compared with an expected result for the signature.

21 Claims, 10 Drawing Sheets

DATA TRANSFER VALIDATION SYSTEM

FIELD OF THE INVENTION

One or more aspects of the invention relate generally to data transfer validation and more particularly, to using signatures to determine if data was transferred without errors.

BACKGROUND OF THE INVENTION

Conventionally, a memory is coupled to a programmable logic device. Stored in the memory is a configuration bitstream. The bitstream is a representation of a design. When provided to the programmable logic device, the bitstream is stored in configuration memory of the programmable logic device, where it is used to configure programmable logic of the programmable logic device with the design.

Heretofore, a Cyclic Redundancy Codes ("CRC") checker was used to determine whether a design was transferred from the memory to the programmable logic device without error. Data was transferred serially one bit at a time into to the programmable logic device. For example for a Field Programmable Gate Array ("FPGA") type of programmable logic device, data was transferred either one bit of data at a time or, to increase throughput, eight bits of data at a time were loaded into the FPGA in parallel. The data was combined into sixteen-bit or thirty-two-bit words, in order to perform a CRC check on the data as it was input to the FPGA. In addition, an FPGA only checks data being read into it, and not whether the data was correctly stored in memory. If the design instantiated in the programmable logic device was tested to determine if it met performance objectives, this could result is substantial wasted time in debugging to determine that the design was not at fault, rather the problem lay in an improper instantiation in programmable logic of the programmable logic device due to corrupted configuration data. Furthermore, as operating voltages are reduced, the problem of accurate data transfer is exacerbated by a reduction in voltage swing for sensing. For a Complex Programmable Logic Device ("CPLD") type of programmable logic device, long words, such as 1200-bit words, may conventionally be transferred into the CPLD or transferred between two memories within the CPLD. Having a very large CRC checker, such as one that would check a 1200-bit word, would consume too much space on a CPLD.

Accordingly, it would be desirable and useful to provide means to generate indicia of a problem with a transfer from external or internal memory to configuration memory of a programmable logic device.

SUMMARY OF THE INVENTION

An aspect of the invention is an integrated circuit comprising an initialization controller having an initialization state machine. The initialization state machine is configured to: cause configuration data to be transferred from external or internal memory to the integrated circuit; cause the integrated circuit to store, read back from storage and compress after being read back into a signature the configuration data; and cause comparison of the signature with an expected result for the signature.

Another aspect of the invention is a data validation system. The integrated circuit has a test access port controller, an initialization controller and a configuration register. The test access port controller has a test access port state machine, an instruction register and an instruction library. The initialization controller is coupled to the test access port controller and has an initialization state machine. The configuration register is coupled to the test access port controller and the initialization controller. The initialization state machine is configured to: cause configuration data to be transferred from a first memory to a second memory; cause the integrated circuit to store, read back from storage and compress after being read back into a signature the configuration data; and cause comparison of the signature with an expected result for the signature.

Another aspect of the invention is a data transfer validation system. A first array of memory cells is for storing configuration data and a first signature of the configuration data. A programmable logic device is externally or internally coupled to the first memory for transfer of the configuration data and the first signature to the programmable logic device. The programmable logic device has a second array of memory cells, an array of sense amplifiers and a configuration register. The second array of memory cells is for storing the configuration data transferred from the first array of memory cells. The configuration register is configured to generate a second signature from the configuration data transferred.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 1A-1 is block diagram depicting an exemplary embodiment of another embodiment of the signature validation system of FIG. 1A.

DETAILED DESCRIPTION OF THE DRAWINGS

Figure 1A:
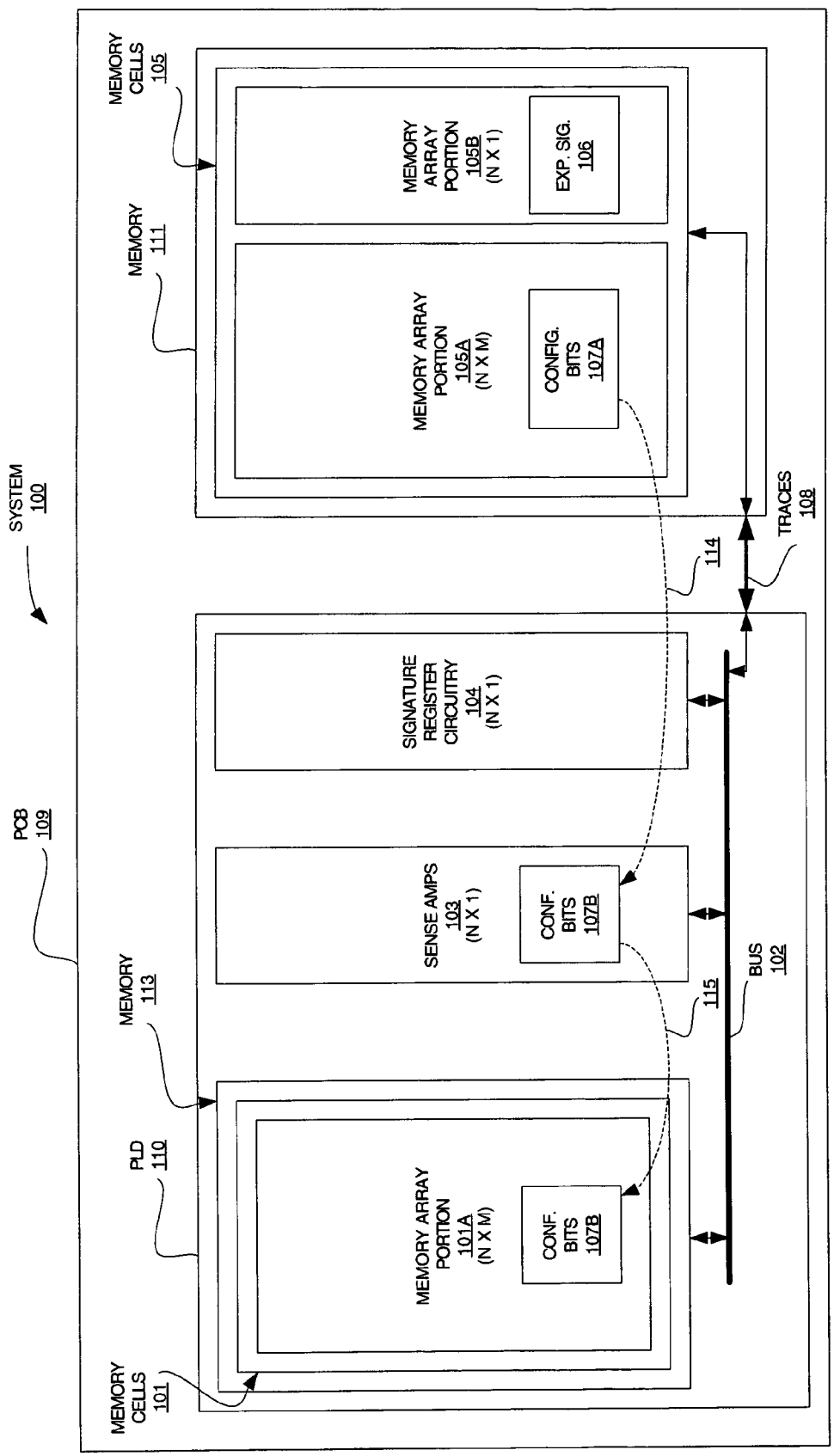
FIGS. 1A, 1B and 1C are block diagrams depicting an exemplary embodiment of a signature validation system at different data processing stages.
Figures 1, 1A:
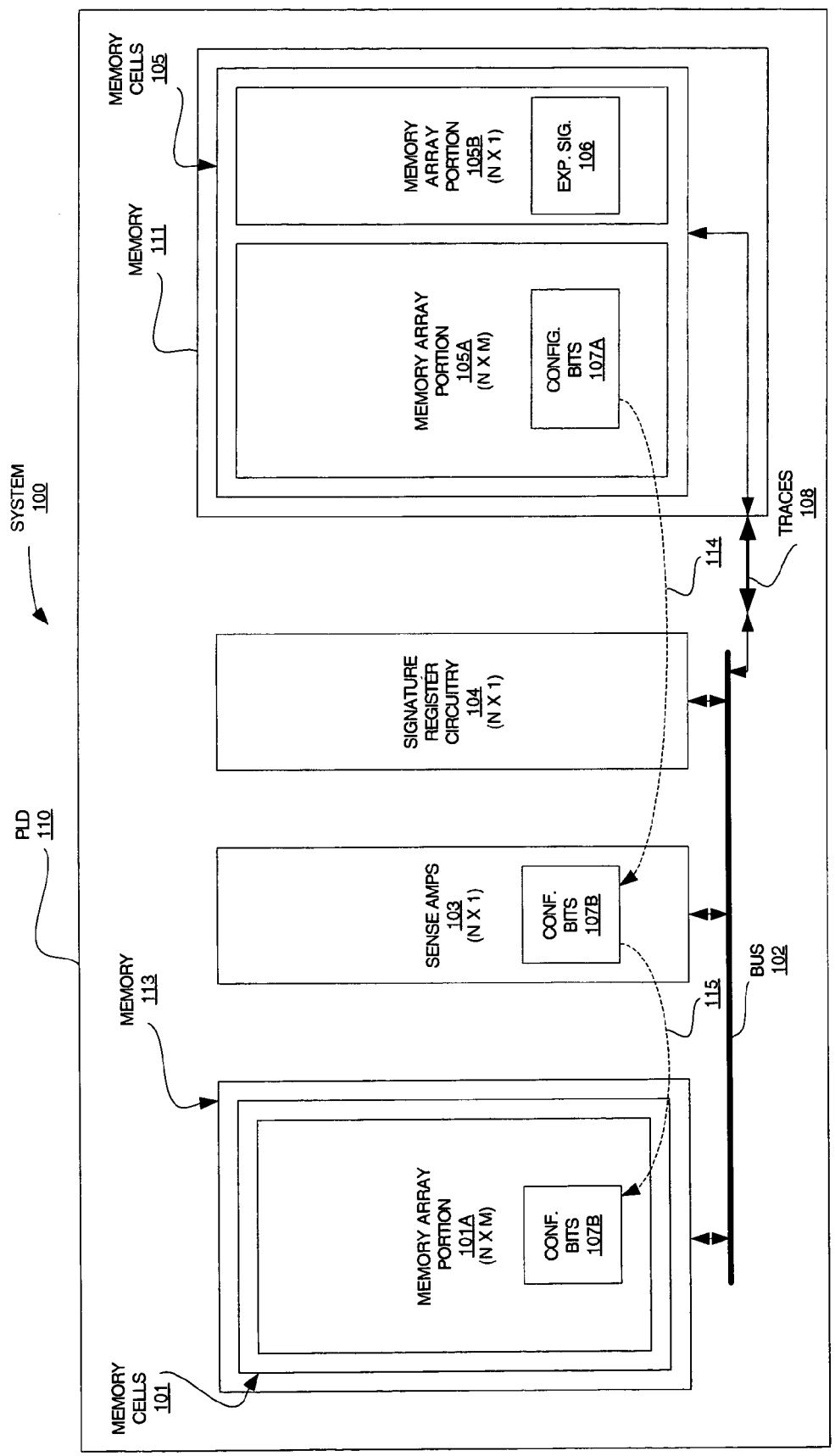
Figure 1B:
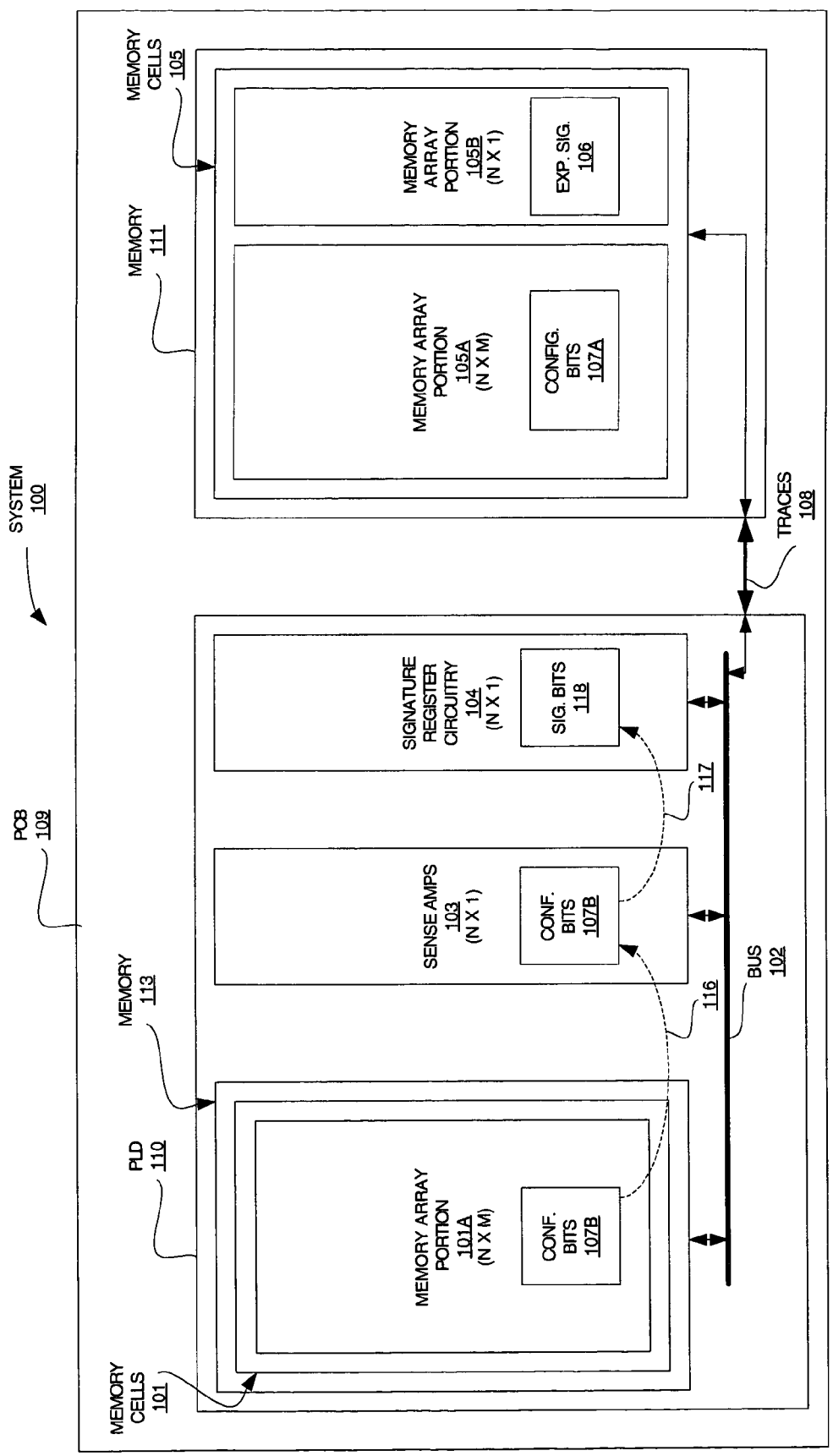
Figure 1C:
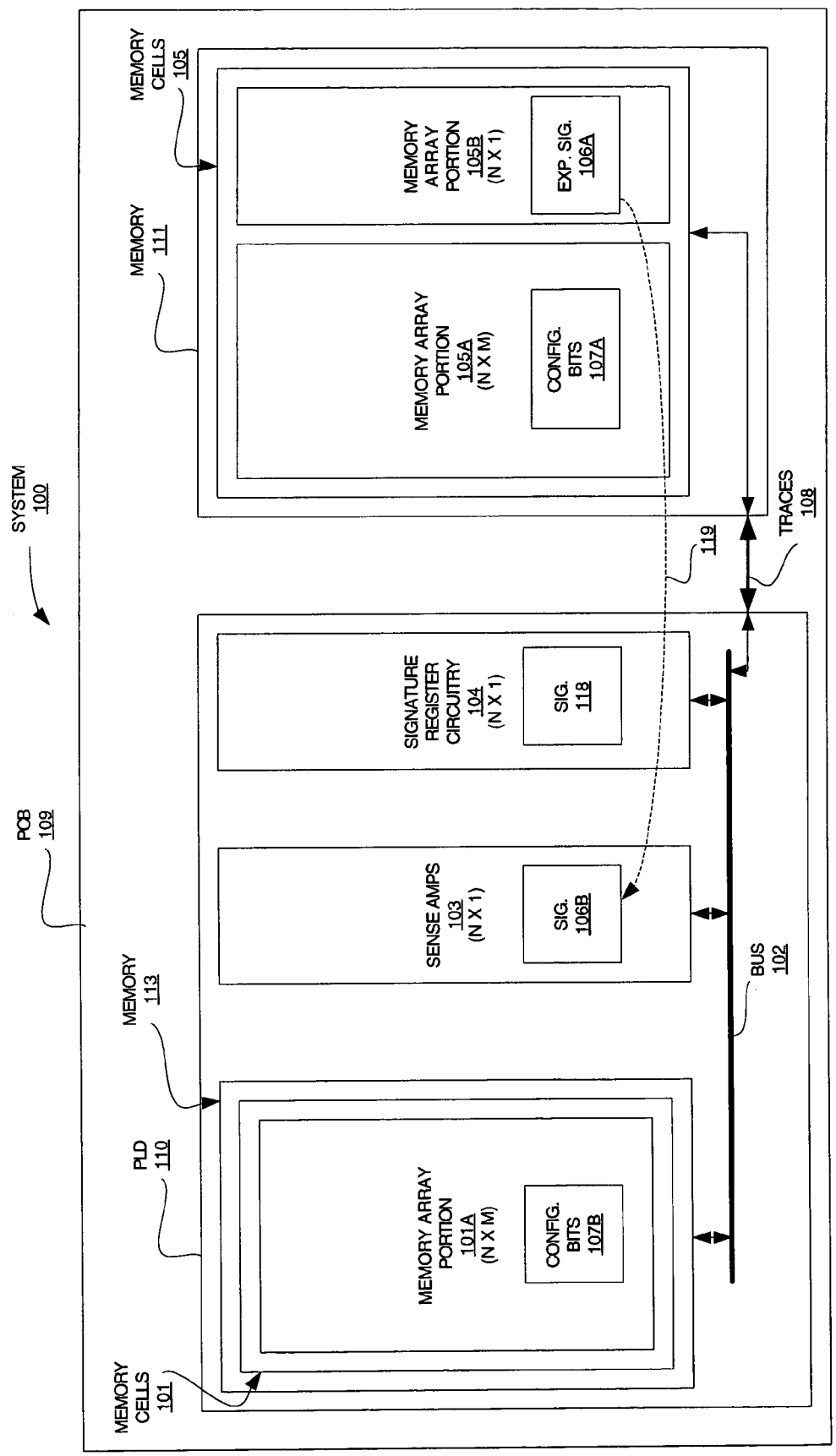

FIGS. 1A, 1B and 1C are block diagrams depicting an exemplary embodiment of a signature validation system 100 at different data processing stages. Signature validation system 100 includes programmable logic device ("PLD") 110, such as a Field Programmable Gate Array ("FPGA") for example, externally coupled to memory 111, such as a nonvolatile memory.

FIG. 1A-1 is a block diagram depicting an exemplary embodiment of another embodiment of signature validation system 100 of FIG. 1A. In this embodiment of signature validation system 100 a PLD 110, such as a Complex Programmable Logic Device ("CPLD"), memory 111 is internal to PLD 110. From the description that follows, it will be apparent that memory 111 may be internally or externally coupled to PLD circuitry.

Memory 111 may be a nonvolatile memory. Examples of nonvolatile memories include, flash memory, electrically erasable programmable read only memory, and disk drive memory, among other types of nonvolatile memory. Notably, memory 111 does not have to be nonvolatile memory, but could be volatile memory, such as dynamic random access memory or static random access memory.

Memory 111 includes memory cells 105. Conventionally, memory cells are formed in an array. A portion of such an array of memory cells 105, namely, memory array portion 105A, is an N-rows by M-columns ("N×M") dimensional array, where N and M are integers greater than one. Another portion of such an array of memory cells 105, namely, memory array portion 105B, is an N-rows by one-column ("N×1") dimensional array. Notably, the term "portion" is meant to include all or a fraction of something.

Memory array portion 105A is used for storing configuration information, such as configuration bits 107A. Memory array portion 105B is used for storing a signature of configuration information, such as expected signature bits 106.

PLD 110 includes memory 113, sense amplifiers ("sense amps") 103 and a signature generator 104. Signature generator 104 is an instantiation of a polynomial. Signature generator 104 may be implemented with signature register circuitry. For clarity, signature generator 104 is described hereinafter as signature register circuitry 104.

Sense amps 103 and signature register circuitry 104 may optionally be one or more external or internal devices to PLD 110. Memory 113 is volatile memory; however, memory 113 could be nonvolatile memory. Memory 113 includes memory cells 101. Conventionally, memory cells are formed in an array. A portion of such an array of memory cells 101, namely, memory array portion 101A is an N-row by M-column ("N×M") dimensional array.

PLD 110 is coupled to memory 111 via traces 108 of printed circuit board ("PCB") 109. Additionally, memory cells 101, sense amps 103 and signature register circuitry 104 are coupled to one another via bus 102. Furthermore, memory cells 105 are coupled to bus 102 via traces 108 for communication with sense amps 103. Notably, there are many known ways of interconnecting devices, and this is merely an exemplary embodiment of a way to interconnect devices. Accordingly, the remainder of this description is not focused on any particular way of interconnecting devices, but rather on data communication for processing.

Configuration bits 107A are transferred from memory array portion 105A to sense amps 103, as indicated by dashed line 114, for sensing one N×1 column at a time for all columns of an N×M matrix stored. Because configuration bits 107A may inadvertently be changed by such transfer to sense amps 103, they are designated as configuration bits 107B in sense amps 103. This inadvertency may be due to noise or other external factors influencing signal propagation along traces 108 or other coupling from memory 111 to PLD 110. Furthermore, it may be that configuration bits 107A (or configuration bits 107B) or expected signature 106A may have inadvertently been changed after storing in memory 111 (or memory 113) due to known external factors.

The output of such sensing by sense amps 103 is provided to memory cells 101, and in particular to memory array portion 101A, as indicated by dashed line 115. This transfer is one N×1 column at a time to store an N×M matrix in memory array portion 101A. Configuration information 107B is transferred to and stored in memory 113 from configuration information 107B processed through sense amps 103.

After storing N×M configuration bits 107B in memory 113, configuration bits 107B are transferred from memory 113 to signature register circuitry 104 via sense amps 103, as indicated by dashed lines 116 and 117. Again, it is assumed that no change in state, other than compression, of bits occurs for this transfer from memory 113 to storage in signature register circuitry 104. Again, this transfer takes place one N×1 column at a time. However, because signature register circuitry is an N×1 dimension, N×M configuration bits 107B are compressed down to provide N×1 generated signature bits 118. Notably, output of sense amps 103 for memory 113 may simultaneously be provided to signature register circuitry 104 for compression, thereby eliminating transfer of configuration bits from memory 113 to signature register circuitry 104. However, it will be assumed that this simultaneous provisioning of output of sense amps 103 is not done for purposes of the description that follows.

It should be understood that generated signature bits 118 are a signature of configurations bits 107B written to memory 113 for configuring programmable circuitry of PLD 110 with a design stored as configuration bits 107A in memory 111.

An N×1 column of expected signature bits 106A are transferred to sense amps 103, as indicated by dashed line 119. It is assumed that sense amps 103 are conventional latching type sense amps, and thus expected signature bits 106A are sensed and in so doing, latched by sense amps 103. However, alternatively N×1 dimension register circuitry (not shown) may be used to temporarily store expected signature bits output from sense amps 103. Notably, expected signature bits 106A are subject to being changed by transfer over traces 108, as previously described with respect to transfer of configuration bits 107A. Accordingly, expected signature bits 106A are denoted as expected signature bits 106B when latched in sense amps 103. Notably, if an error is introduced in both configuration bits 107A and expected signature bits 106A due to transfer, it is theoretically possible that expected signature 106B will match generated signature bits 118. However, for significantly large values of N or M, this theoretical possibility becomes statistically insignificant.

To increase tolerance to error, expected signature bits 106A may be transferred at a slower data rate than transfer of configuration bits 107A, as expected signature bits 106A are substantially fewer in number than configuration bits 107A.

Figure 2:
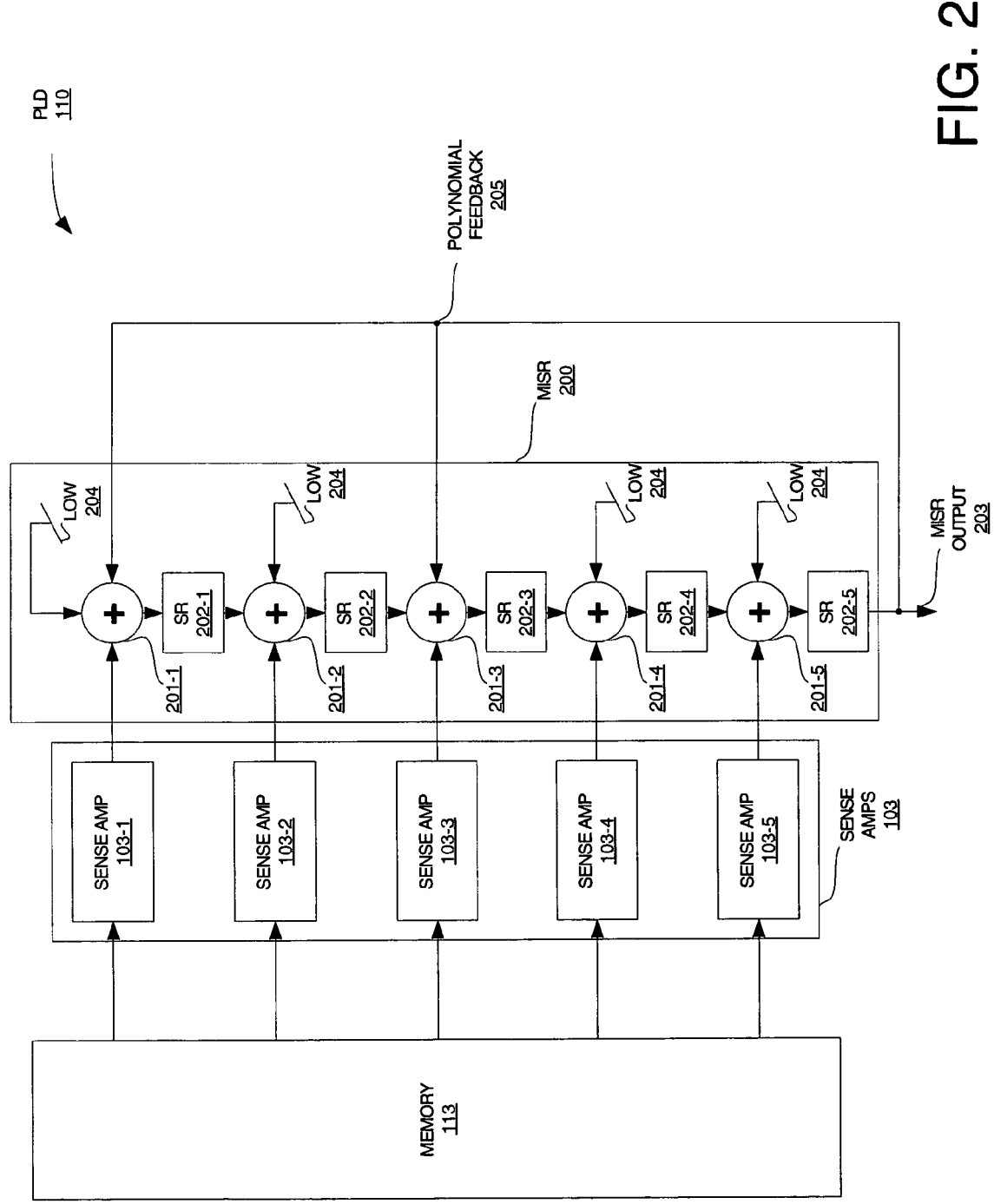
FIG. 2 is a block diagram of an exemplary embodiment of a programmable logic device with a Multiple Input Signature Register.

FIG. 2 is a block diagram of an exemplary embodiment of PLD 110 with a Multiple Input Signature Register ("MISR") 200. Though signature register circuitry 104 may be implemented with any known signature creator, a MISR is described for purposes of clarity by way of example. MISR 200 is an example of an implementation of a MISR algorithm that may be used to create a signature, such as generated signature 118 and expected signature 106A. Notably, both signatures 106A and 118 are created using the same signature algorithm or other compression algorithm.

Configuration bits 107B are read out of memory 113 to sense amps 103-1 through 103-5. Though five sense amps are shown for an N-bit vector where in this example N is equal to five, fewer or more sense amps 103 may be used.

Output of sense amps 103-1 through 103-5 is respectively provided as input to XOR gates 201-1 through 201-5 of MISR 200.

Between XOR gates 201-1 through 201-5 are respective signature registers 202-1 through 202-5. XOR gates 201-1 through 201-5 and signature registers 202-1 through 202-5 are connected in series to form a chain. However, output of signature register 202-5 is provided as input to XOR gates 201-3 in addition to XOR gate 201-1. Furthermore, XOR gates 201-1, 201-2, 201-4 and 201-5 each have another input which is coupled a low logic level voltage 204. MISR output 203 may be pushed out of MISR 200, as described below in additional detail. Thus, in this example, MISR 200 is a 5×1 bit device used to implement a polynomial, namely:

$$x^0+x^2+x^5. \qquad (1)$$

Notably, polynomial selection may be done to reduce the number of feedback paths. It should be understood that the total number of possibilities for polynomials or signatures is in the range of, $$2^N \qquad (2)$$

for comparison of $$2^{N*M} \qquad (3)$$

data bits. Conventionally, for CPLDs, N is in a range of approximately 250 to 1200 and M is in a range of approximately 70 to 200. For FPGAs, conventionally N is a range of approximately 1000 to 6000 and M is in a range of approximately 225 to 1400. Thus, so there is little chance of the correct signature matching the wrong data. More specifically, there is a $1/(2^N)$ probability of accidentally having a signature that correctly matches even though the data was misread. Thus, MISR 200 creates an N-bit vector represented by an N by M data pattern, which is a thorough and reliable check for single bit errors.

Output from memory 113 is sensed by sense amps 103 one column at a time. Output of sense amps 103 is compressed through three-input XOR gates 201, the output of which is stored in signature registers 202. And, feedback from the last signature register (signature register 202-5 in this example) provides input to selected XOR gates 201 according to a polynomial of a predetermined table of polynomials, such as a table of irreducible polynomials over a finite field.

Accordingly, it should be understood that MISR 200 sequentially reads each column of data and mathematically combines it with a previous column of data. Each bit into an XOR gate 201 is summed, such as a sum of a current column bit being read (input from a sense amp 103), a previous column bit being read (input from a signature register 202) and either a polynomial feedback 205 or a static (mathematical constant) input 204. Selection of feedback may reduce probability of aliasing.

Notably, expected and generated signatures may be compared to produce a one bit output indicating either pass or fail. In an embodiment, MISR 200 is used to store a generated signature. Sense amps 103 are used to process an expected signature into MISR 200 for comparison to produce a pass/fail output 203. In this embodiment, XOR gates 201 are used for MISR addition, 2 bit comparison and as a pass gate for pass through operation. Alternatively, additional circuitry may be used for such a comparison, as described below with reference to FIGS. 3A and 3B.

Figure 3A:
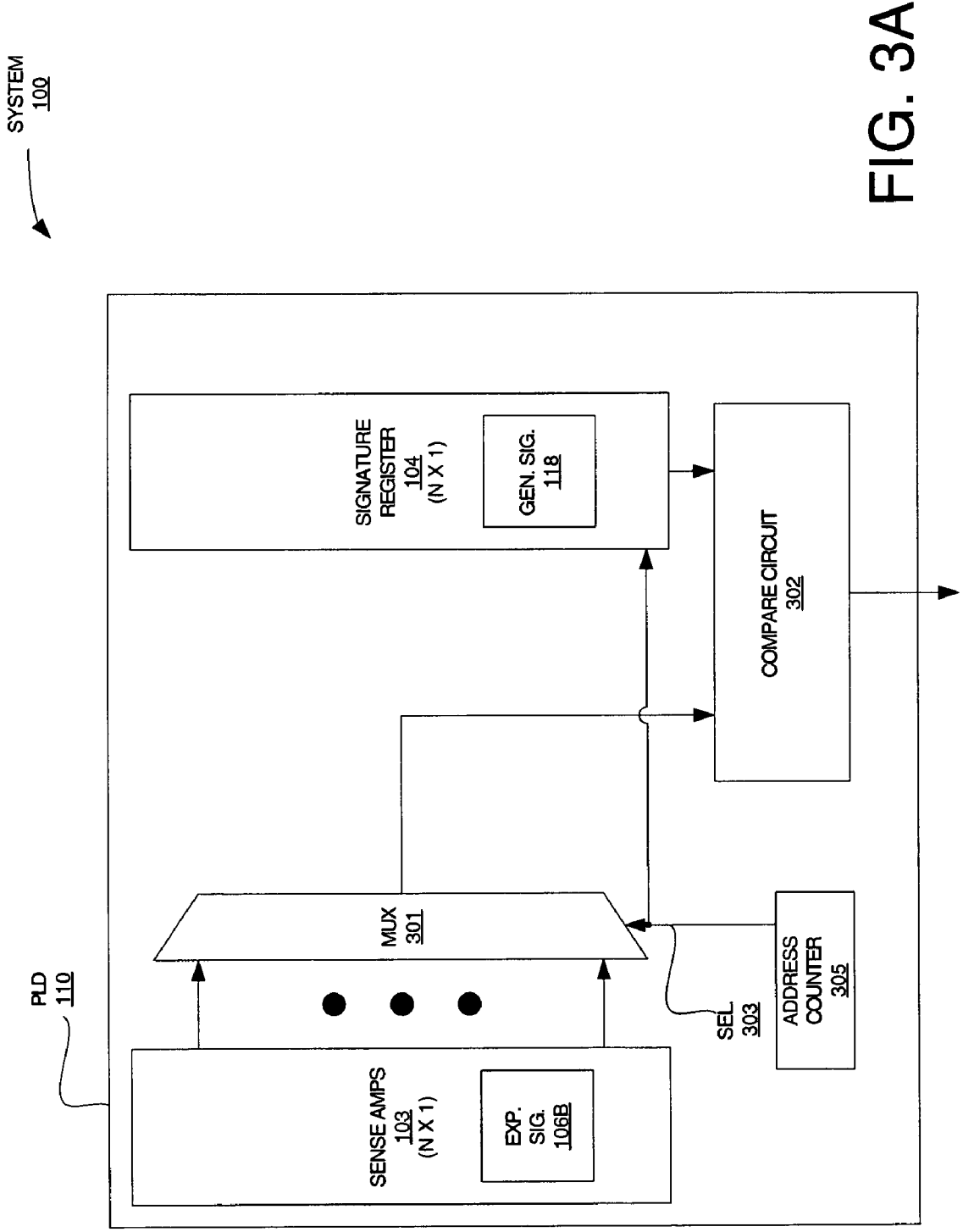
FIG. 3A is a block diagram of an exemplary embodiment of a programmable logic device of the signature validation system FIG. 1.

FIG. 3A is a block/schematic diagram of an exemplary embodiment of PLD 110 of signature validation system 100.

With expected signature 106B and generated signature 118 temporarily stored as respective N×1 columns of bits, a comparison of such signatures will provide an indication of whether configuration information for a design stored in memory 113 is correct. It should be appreciated that there is a one-to-one correspondence of bits between expected signature 106B and generated signature 118. For example, each bit in the (n, 1) location, for n an integer in the set of N, of each of column of expected signature 106B and generated signature 118, should be equivalent if no error was introduced. If they are not equivalent, this is an indicator that an error was introduced. Accordingly, by pulling out each corresponding pair of bits, one from each column, an indication of whether an error was introduced in design configuration information may be obtained.

Thus, for example multiplexer 301 may be coupled to outputs from sense amps 103. A controlled select signal 303 is provided to multiplexer 301 to select a bit of expected signature bits 106B from sense amps 103 for output to comparison circuitry 302. Controlled select signal 303 may be provided from an address counter 305. Select signal 303 is provide to signature register circuitry 104 to shift out a bit of generated signature 118. Compare circuitry 302 does a bitwise comparison for each pair of bits input to it. If the bits are equivalent, then this is indicia of no error. If, however, the bits are not equivalent, then this is indicia of error.

Notably, signature registers 202 include conventional shift registers. Thus, data may be shifted out of signature registers 202 in a known manner. However, this type of read is a destructive read.

Figure 3B:
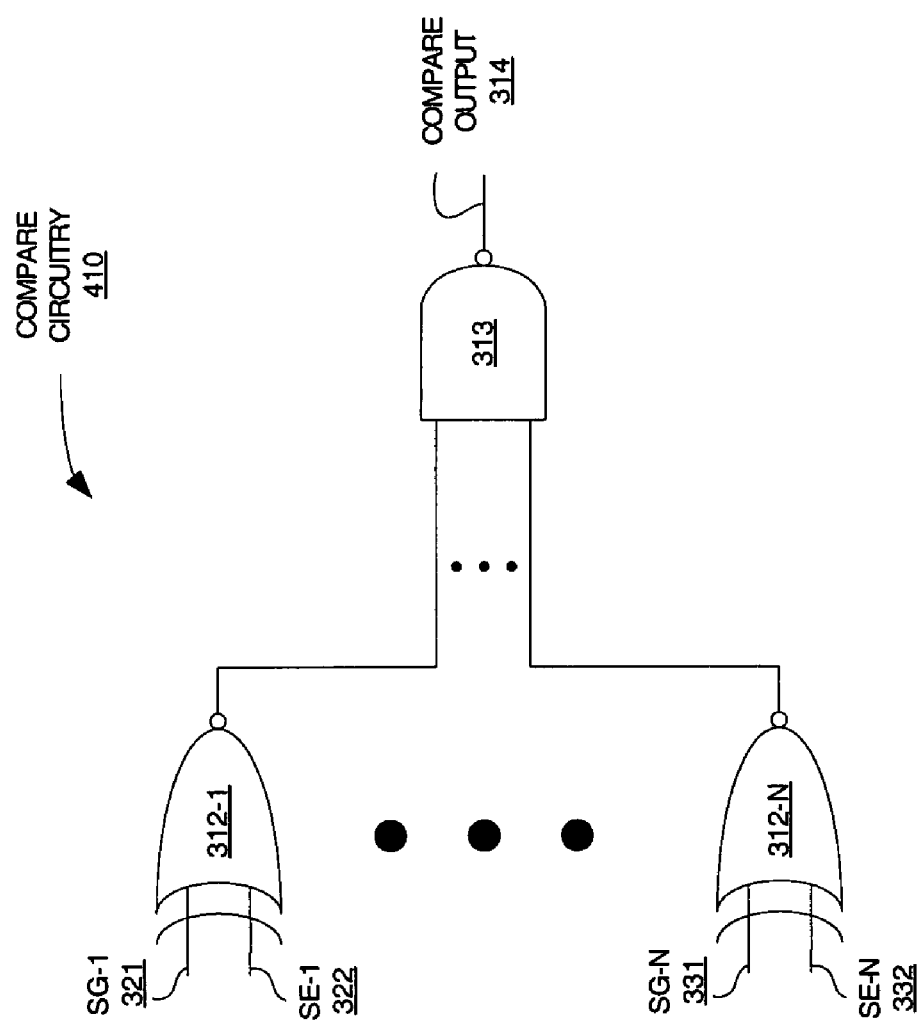
FIG. 3B is a schematic diagram depicting an exemplary embodiment of comparison circuitry for a non-destructive read out of signature registers.

FIG. 3B is a schematic diagram depicting an exemplary embodiment of comparison circuitry 410 for a non-destructive read out of signature registers 202. A bit in the first position from generated signature 118, namely, bit SG-1 321, is compared with a bit in the first position from expected signature 106B, namely, bit SE-1 322. This bitwise comparison may be done by providing SG-1 321 and SE-1 322 as inputs to exclusive-NOR gate 312-1. This type of comparison is done for all N bits. Moreover, a bit in the Nth position from generated signature 118, namely, bit SG-N 331, is compared with a bit in the Nth position from expected signature 106B, namely, bit SE-N 332 with exclusive-NOR gate 312-N.

Accordingly, for each pair of bits compared, an exclusive-NOR gate 312 will produce a logic one for each comparison indicating that there was equivalence in bits and will produce a logic zero for each comparison indicating that there was no equivalence in bits. Outputs of exclusive-NOR gates 312-1 through 312-N are provided as inputs to NAND gate 313. Accordingly, if all inputs to NAND gate 313 are logic one, then compare output 314 would be a logic zero, indicating a pass condition. If, however, inputs to NAND gate were any combination of one or more logic ones and zeros or all logic zeros, output 314 of NAND gate 313 would be a logic one, indicating a fail condition. Of course, this is just one example of combinatorial logic, and many other equivalent combinatorial circuits may be used.

Accordingly, in an implementation of a signature validation system initialization process configuration data 107 stored in memory 111 is automatically transferred for duplication in memory 113 of system 100. This transfer may be done one word of data at a time. A signature generator, which is a signature-dependent initialization controller, uses a mathematical algorithm to create a signature from this transferred configuration data, which mathematical algorithm may be instantiated with signature register circuitry 104. The signature created is compared with a pre-calculated signature of configuration data stored in memory 111, or some other location. Notably, if the generated signature and the pre-calculated expected signature do not match, the initialization process may be restarted. Moreover, such comparison of signatures may be part of a Built-In Self-Test ("BIST").

Figure 4A:
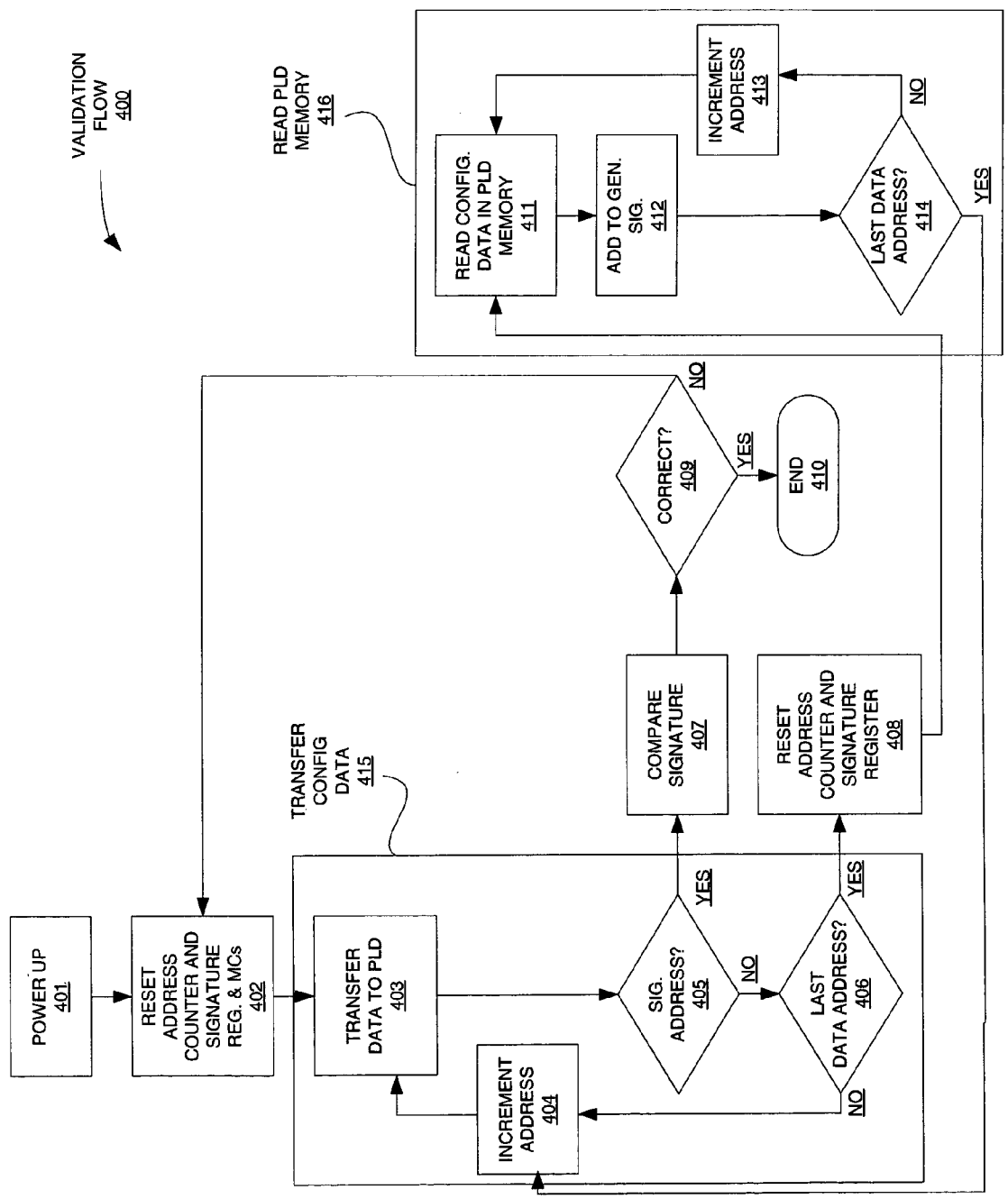
FIGS. 4A and 4B are respective flow diagrams depicting exemplary embodiments of signature validation flows.

FIG. 4A is a flow diagram depicting an exemplary embodiment of a signature validation flow 400. Signature validation flow 400 is described with simultaneous reference to FIGS. 1A and 3A.

At 401, signature validation system 100 is powered up. At 402, an address counter and signature register, such as address counter 305 and signature register 104, are initially set or reset ("initialized"). Additionally, at 402 and responsive to power up at 401, memory cells are initialized. For example, memory cells 101 and signature register circuitry 104 both of FIG. 1A may all be initialized to a known value, such as all logic ones or all logic zeros. For clarity, it will be assumed that a seed or initial value for a MISR for signature register circuitry 104 is all zeros. In an embodiment, if an accumulated signature for data stored in memory cells 101 is all zeros at completion of a read, then data will have been properly read from memory 111 of FIG. 1A. In another embodiment, memory array portion 101A is bulk erased such that all memory cell bits are initialized to logic one such that if all bits are correctly transferred from memory 111 to memory 113, then all shift registers 202 of FIG. 1A will have a final accumulated value of a signature that represents the erased array.

At 403, configuration data is transferred, such as one column, address or word at a time, from a reference source to a configurable source, such as from memory 111 to memory 113. In this embodiment, all configuration data is transferred, and then transferred configuration data is read back from memory 113 while a signature is generated.

At 405, it is determined whether an address of transferred configuration data is an address for the signature stored in memory 111. The signature address is one address beyond the last data address for the configuration data. If the address is not the signature address, then at 406 it is determined whether the address is the last data address of the configuration data. If at 406 the address is not the last data address, then at 404 the address is incremented to get a next column. The incremented address is used to access configuration data for transfer at 403.

If the address is the signature address, as determined at 405, then at 407 a generated signature is compared with an expected signature. If the signatures match as determined at 409, then signature validation flow 400 ends at 410. If, however, the signatures do not match at 409, the transfer of configuration data from memory 111 to memory 113 is redone starting with resetting of the address counter and signature register at 402.

If the address is found to be the last data address at 406, then at 408 the address counter and signature register are reset. At 411, configuration data transferred to memory 113 is read back one column at a time. At 412, each column is added to signature register 104 or to any prior column or sum of prior columns in order to eventually generate a signature. At 414, it is determined whether the address is the last data address. If the address is not the last data address, then at 413 the current address is incremented to get a next column. At 411 a next column is read using the incremented address. If, however, at 414 the address is the last data address, meaning a signature has been generated for configuration data read back from memory 113, then the address is incremented again at 404. Then at 403 a signature stored in memory 111 is transferred to PLD 110 for sensing using the last data address. At 405, the address will be determined to be the signature address for comparison of the generated signature from 412 with the expected signature transferred at 403.

Figure 4B:
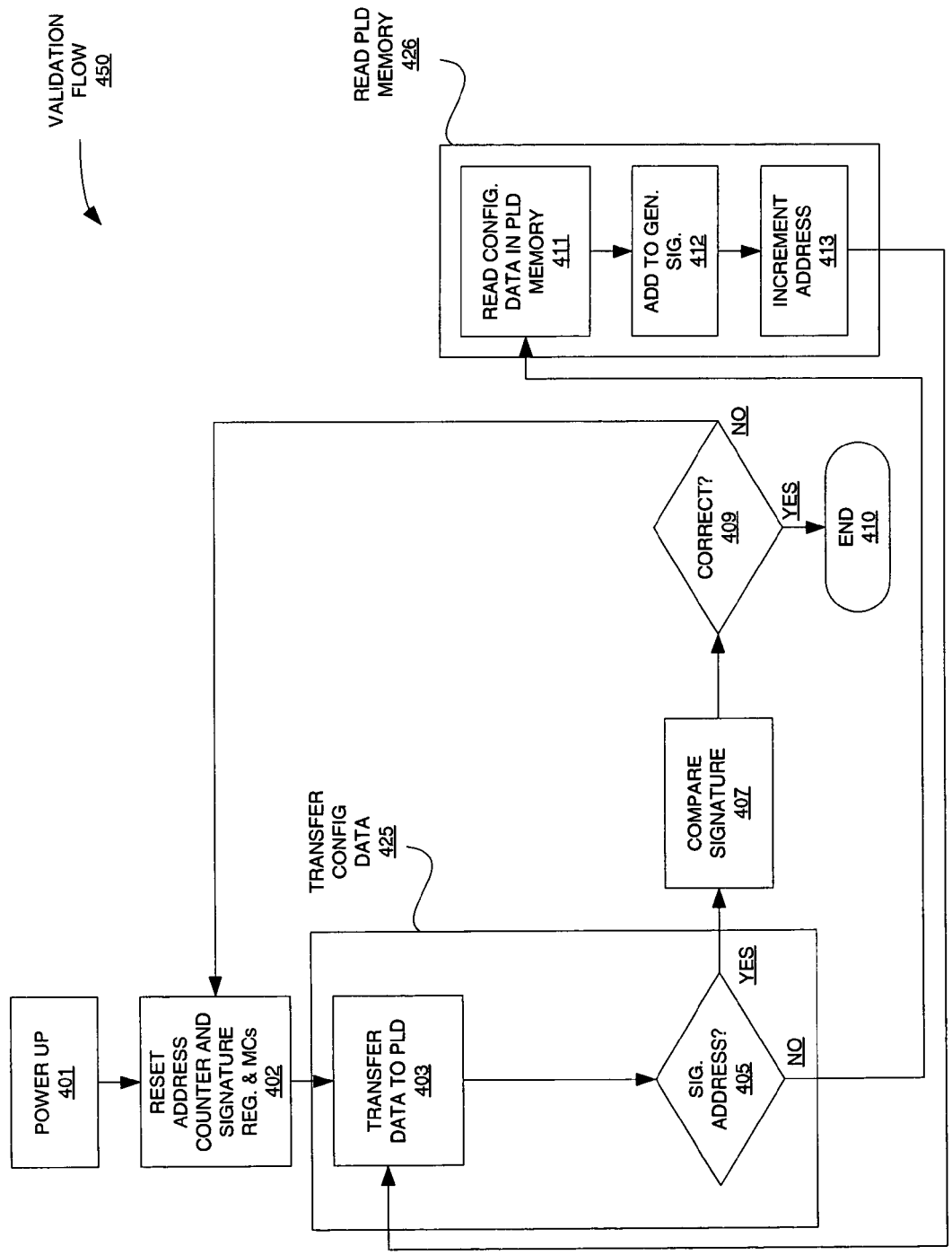

FIG. 4B is a flow diagram depicting an exemplary embodiment of a signature validation flow 450. Signature validation flow 450 is described with simultaneous reference to FIGS. 1A and 3A. Because signature validation flow 450 has common elements with signature validation flow 400, the description of those common elements is not repeated.

In contrast to signature validation flow 400, rather than transferring all columns of configuration data and then doing a read back, in signature validation flow 450 a read back is done after transfer of each column of configuration data.

At 403, a column of configuration data is transferred from memory 111 to memory 113. At 405, it is determined whether the transferred column of data is the expected signature by determining whether the address used for the transfer was the expected signature address.

In response to the address used for the transfer not being the expected signature address, at 411 the transferred column of data is read back from memory 113. At 412 the read back column of data is added to generate a signature. At 413, the address is incremented. At 403, the incremented address is used to obtain a next column of configuration data until all configuration data has been transferred. When the incremented address from 413 is the expected signature address, then at 403 the expected signature is transferred. At 405, the expected signature address causes a comparison to take place, as previously described.

Figure 5:
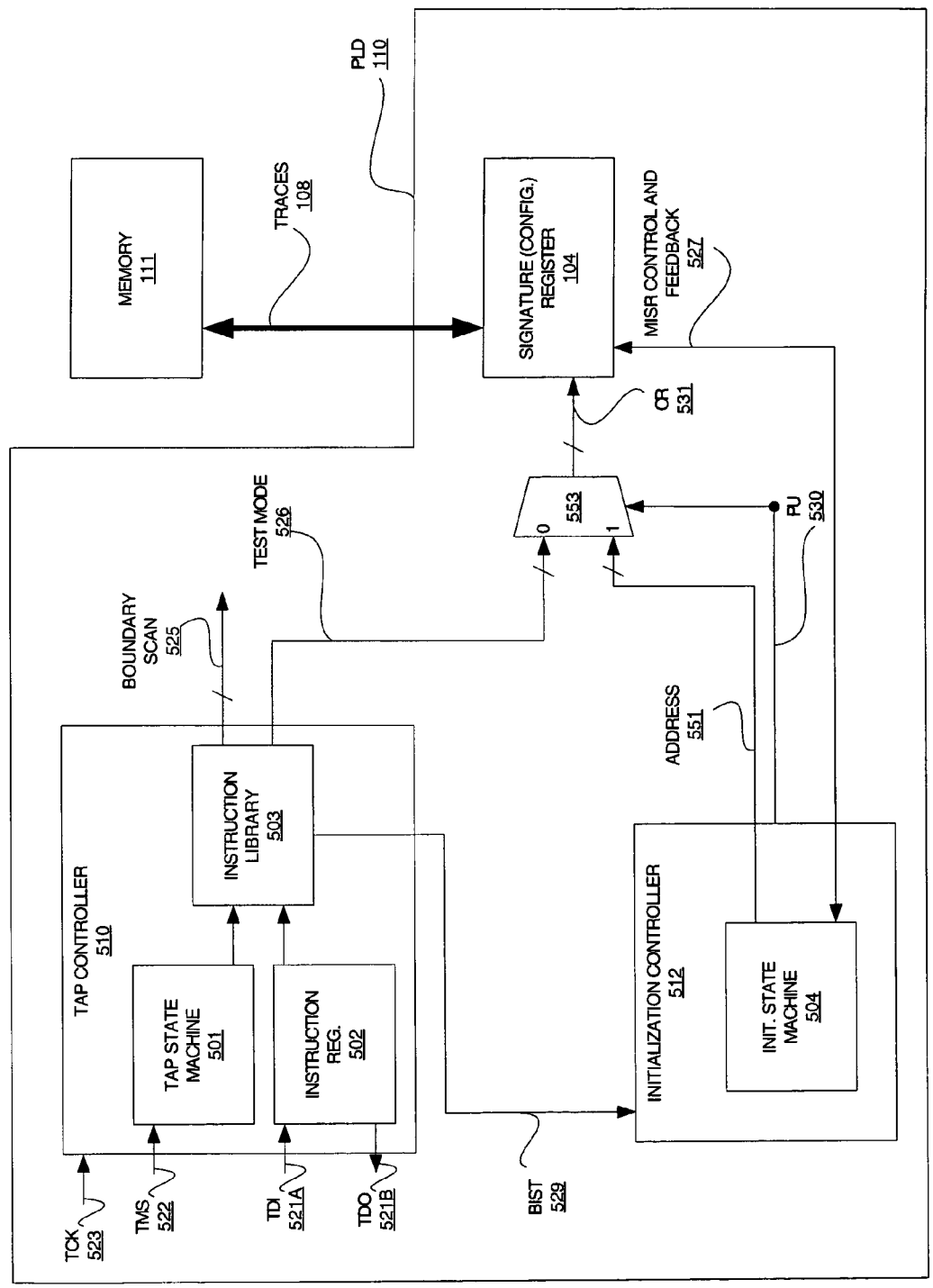
FIG. 5 is a schematic/block diagram depicting an exemplary embodiment of a portion of the system of FIG. 1A with an initialization controller.

FIG. 5 is a schematic/block diagram depicting an exemplary embodiment of a portion of signature validation system 100 of FIG. 1A including an initialization controller 512 and a Test Access Port ("TAP") controller 510. TAP controller 510 is a known controller in accordance with I.E.E.E. 1149.1 or Joint Test Action Group ("JTAG").

TAP controller 510 is accessed through a TAP including four pins, namely, TCK (test clock) 523, TDI (test data input) 521A, TDO (test data output) 521B, and TMS (test mode signal) 522. A TAP state machine 501 receives a test mode signal to select an instruction from instruction library 503. Data is input to instruction register means 502 for provisioning to instruction library 503. Instructions that may be output from instruction library 503 include boundary scan signals 525, test vectors for input to multiplexer 553 and Built-In Self-Test ("BIST") instruction signal 529. A test mode select signal 526 is provided as a control signal to multiplexer 553 to select a test mode output.

BIST instruction signal 529 is provided to initialization controller 512. Initialization controller 512 includes initialization state machine 504, such as described with respect to FIGS. 4A and 4B. Outputs from initialization controller 512 include: power-up ("PU") signal 530, which is provided as a select signal to multiplexer 553; address signal 551; and MISR control signal 527. Output of multiplexer 553 is a configuration register signal 531 responsive to selection via PU signal 530 of a test vector or an address and provided to signature (configuration) register 104, for configuring registers, including, but not limited to, resetting registers. Accordingly, for powering up, as indicated by PU signal 530, or for executing a TAP controller BIST instruction, as indicated by BIST signal 529, initialization controller 512 takes control as described with reference to FIGS. 4A and 4B. Otherwise, TAP controller 510 is in control. Feedback, via MISR control and feedback signal 527 from configuration register 104 to state machine 504, may include a result indicating whether or not an expected signature correctly matched a generated signature.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

The invention claimed is:

1. A data transfer validation system, comprising:
a first array of memory cells for storing configuration data and a first signature of the configuration data;
a programmable logic device externally or internally coupled to the first array of memory cells for transfer of the configuration data and the first signature to the programmable logic device, the programmable logic device having a second array of memory cells, an array of sense amplifiers and a configuration register, the second array of memory cells for storing the configuration data transferred from the first array of memory cells, the configuration register configured to generate a second signature from the configuration data transferred;
herein the configuration resister is coupled to receive the configuration data in parallel from the second array of memory cells via the array of sense amplifiers;
wherein the configuration resister is configured to compress the configuration data obtained from the second array of memory cells into the second signature for comparison with the first signature; and
wherein the configuration register does not have to be seeded to compress the configuration data obtained from the second array of memory cells into the second signature.

2. The data transfer validation system, according to claim 1, wherein the programmable logic device comprises a comparator configured to compare the first signature and the second signature.

3. The data transfer validation system, according to claim 2, wherein the comparator is configured for a bitwise comparison of the first signature and the second signature.

4. The data transfer validation system, according to claim 1, wherein the configuration register comprises a signature generator.

5. The data transfer validation system, according to claim 4, wherein the signature generator comprises a Multiple Input Signature Register ("MISR").

6. The data transfer validation system, according to claim 1, wherein the array of sense amplifiers are coupled to receive the first signature for comparison with the second signature stored in the configuration register.

7. The data transfer validation system, according to claim 1, wherein the programmable logic device comprises an initialization controller coupled to the configuration register.

8. The data transfer validation system, according to claim 7, wherein the initialization controller comprises an initialization state machine, the initialization state machine configured to:
reset the configuration register;
cause the configuration data to be transferred from the first array of memory cells to the second array of memory cells;
read the configuration data stored in the second array of memory cells to generate the second signature; and
obtain an outcome of a comparison of the first signature and the second signature.

9. The data transfer validation system, according to claim 8, wherein the initialization state machine is configured to read back the configuration data from the second array of memory cells after each column of the configuration data is stored therein.

10. The data transfer validation system, according to claim 8, wherein the initialization state machine is configured to read back the configuration data from the second array of memory cells after all columns of the configuration data are stored therein.

11. A data validation system, comprising:
an integrated circuit having a test access port controller, an initialization controller and a configuration register;
the test access port controller having a test access port state machine, an instruction register and an instruction library;
the initialization controller coupled to the test access port controller, the initialization controller having an initialization state machine;
the configuration register coupled to the test access port controller and the initialization controller;
the initialization state machine configured to:
cause configuration data to be transferred from a first memory to a second memory;
cause the integrated circuit to store, read back from storage and compress after being read back into a signature the configuration data; and
cause comparison of the signature with an expected result for the signature;
wherein the configuration register is coupled to receive the configuration data in parallel from the second memory to compress the configuration data obtained therefrom into the signature for comparison with the expected result for the signature; and
wherein the configuration register does not have to be seeded to compress the configuration data into the signature.

12. The data validation system, according to claim 11, wherein the initialization state machine is configured to read back the configuration data after each column of the configuration data is stored.

13. The data validation system, according to claim 11, wherein the initialization state machine is configured to read back the configuration data memory cells after all columns of the configuration data are stored in the integrated circuit.

14. The data validation system, according to claim 11, wherein the initialization controller is configured to have control responsive to a built-in self-test instruction or power up condition.

15. The data validation system, according to claim 11, wherein the integrated circuit is a programmable logic device.

16. The data validation system, according to claim 15, wherein the programmable logic device is selected from the group consisting of a field programmable gate array and a complex programmable logic device.

17. The data validation system, according to claim 11, wherein the first memory is external to the integrated circuit, and wherein the second memory is internal to the integrated circuit.

18. The data validation system, according to claim 11, wherein the first memory and the second memory are internal to the integrated circuit.

19. An integrated circuit, comprising:

an initialization controller having an initialization state machine, the initialization state machine configured to:

cause configuration data to be transferred from a first memory internal or external to the integrated circuit to a second memory internal to the integrated circuit;

cause the integrated circuit to store, read back from storage and compress after being read back into a signature of the configuration data;

cause comparison of the signature with an expected result for the signature;

wherein the integrated circuit is configured to read back the configuration data in parallel from the storage to compress the configuration data obtained therefrom into the signature for comparison with the expected result for the signature; and wherein the integrated circuit does not have to be seeded to compress the configuration data into the signature.

20. The integrated circuit, according to claim 19, wherein the expected result for the signature is obtainable from the first memory.

21. The integrated circuit, according to claim 19, wherein the initialization state machine is responsive to a power up condition or a built-in self-test instruction.

* * * * *